(12) United States Patent
Kim

(10) Patent No.: US 8,973,060 B2
(45) Date of Patent: Mar. 3, 2015

(54) TERMINAL FOR REPEATING THROUGH MBS COMMUNICATION NETWORK AND METHOD OF REPEATING USING THE SAME

(75) Inventor: Young-Il Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 76 days.

(21) Appl. No.: 13/289,412

(22) Filed: Nov. 4, 2011

(65) Prior Publication Data

US 2012/0124627 A1 May 17, 2012

(30) Foreign Application Priority Data

Nov. 11, 2010 (KR) .......................... 10-2010-0112140

(51) Int. Cl.
*H04N 7/20* (2006.01)
*H04B 7/155* (2006.01)
*H04W 88/04* (2009.01)

(52) U.S. Cl.
CPC ............. *H04B 7/1555* (2013.01); *H04W 88/04* (2013.01)
USPC .................. 725/71; 725/67; 725/68; 725/70; 725/127; 455/8; 455/9; 455/10; 455/11; 455/12; 455/13; 455/14; 455/15; 455/16; 455/17; 455/18; 455/19; 455/20; 455/21; 455/22; 455/23; 455/24; 455/25

(58) Field of Classification Search
USPC ................. 725/67–68, 70–71, 127; 455/8–25
See application file for complete search history.

(56) References Cited

U.S. PATENT DOCUMENTS

| 7,710,913 | B2 * | 5/2010 | Kilfoyle et al. | 370/328 |
| 8,014,330 | B2 * | 9/2011 | Kim et al. | 370/312 |
| 2003/0211827 | A1 * | 11/2003 | Yonezawa et al. | 455/7 |
| 2005/0107034 | A1 * | 5/2005 | Lee et al. | 455/11.1 |
| 2007/0140270 | A1 * | 6/2007 | Hulkkonen | 370/401 |
| 2007/0197174 | A1 * | 8/2007 | Kim et al. | 455/140 |
| 2007/0202826 | A1 * | 8/2007 | Dean | 455/230 |
| 2010/0009625 | A1 * | 1/2010 | Chami et al. | 455/11.1 |
| 2011/0235568 | A1 * | 9/2011 | Esteves et al. | 370/315 |
| 2011/0276896 | A1 * | 11/2011 | Zambetti et al. | 715/751 |

FOREIGN PATENT DOCUMENTS

| KR | 10-2005-0053718 | 6/2005 |
| KR | 10-2007-0082666 | 8/2007 |
| KR | 10-2010-0087427 | 8/2010 |
| KR | 10-2010-0110746 | 10/2010 |

* cited by examiner

*Primary Examiner* — Jason Salce
(74) *Attorney, Agent, or Firm* — Staas & Halsey LLP

(57) ABSTRACT

There is provided a method where a terminal amplifies an MBS signal that the terminal receives using a terminal in an MBS service, transmits the amplified signal to another terminal and controls it in order to overcome the fact it is not possible to provide high quality contents over a broad area due to interference signals between MBS zones, a terminal is used as a repeater at MBS transmission time only, and an output of a repeating signal of the terminal is controlled so that an excessive interference signal for another MBS area is not generated when the terminal operates as a repeater.

6 Claims, 8 Drawing Sheets

TERMINAL FOR REPEATING THROUGH MBS COMMUNICATION NETWORK AND METHOD OF REPEATING USING THE SAME

CROSS-REFERENCE TO RELATED APPLICATION

This application claims the benefit under 35 U.S.C. §119 (a) of Korean Patent Application No. 10-2010-0112140, filed on Nov. 11, 2010, in the Korean Intellectual Property Office, the disclosure of which is incorporated by reference in its entirety for all purposes.

BACKGROUND

1. Field

The following description relates to a multicast and broadcasting service (MBS) for a mobile IPTV service, and more particularly, to a method of operating a terminal as an amplified and forwarding repeater in order to improve a service quality in the MBS for the mobile IPTV.

2. Description of the Related Art

There has been much interest in a point to multipoint service for providing a plurality of users with the same contents on a network through one link, that is, a multicast broadcast service (referred to as "MBS", hereinafter).

In a broadband wireless communication system based on Institute of Electrical and Electronics Engineers (IEEE) 802.16d/e or WIMAX standard, the MBS is a service that provides a number of subscribers with the same data.

Such an MBS can generally be divided into a multicast service in which a user dynamically joins and leaves an IP session and a broadcast service in which multicast contents are always transmitted regardless of users.

Such an MBS should transmit the same MBS contents to a number of terminals using the same multicast CID (referred to as "MCID", hereinafter).

Further, since base stations (BSs) in an MBS_zone should support macro diversity, there should not be difference between transmission times. Further, data should be exchanged between a BS and an access service network (ASN).

The MBS network can identify a multicast and broadcast service zone. That is, an MBS_zone is used to indicate a broadcast and multicast service flow available zone. A BS broadcasts MBS_zone information using a downlink channel descriptor (DCD) message. That is, the MBS_zone is regarded as the same BS group to transmit contents.

Such MBS service is divided into a single-BS access and a multi-BS access according to a service access method of a mobile terminal. The single-BS access method is a method where a mobile terminal receives an MBS from one BS in which the mobile terminal is registered, and the multi-BS access is a method where a mobile terminal receives an MBS from two or more BSs at the same time.

In order to provide a high quality mobile IPTV service, a transmission quality is secured in an access network. While a transmission quality is improved by constructing an MBS network and minimizing interference in Mobile WiMAX and 3GPP/LTE, in addition to interference between the MBS_zones, which reduces the transmission quality, a wireless environment is deteriorated due to the effects such as radio wave propagation loss and fading according to a geographical condition such as a building even in the MBS_zone, which limits an improvement of the transmission quality.

A method for improving a reception signal quality of a terminal in a deteriorated wireless environment using a repeater that is receiving an MBS service, thereby providing a high quality broadcasting service, is needed.

SUMMARY

Exemplary embodiments provide high quality contents over a broad area due to interference signals between MBS zones, there is provided a method where a terminal amplifies an MBS signal that the terminal receives using a terminal in an MBS service, transmits the amplified signal to another terminal and controls it.

Further, exemplary embodiments provide a transmission method where a terminal is used as a repeater at MBS transmission time only, and an output of a repeating signal of the terminal is controlled so that an excessive interference signal for another MBS area is not generated when the terminal operates as a repeater.

According to an exemplary aspect, there is provided a terminal of receiving contents through an MBS communication network constructed of at least one base station (BS), the terminal of repeating through the MBS communication network including: a receiver to receive a wireless signal for the contents from a BS constituting the MBS communication network; a signal processor to amplify or convert the received wireless signal; and a transmitter to repeat the processed wireless signal.

In some exemplary embodiments, the signal processor includes an interference signal extractor to extract a level of an interference signal other than the signal for the contents to be provided among the received wireless signal; a signal amplifying unit to amplify the received wireless signal; and a repeating controller to enable the amplifying unit to amplify the signal for the MBS zone among frames included in the received wireless signal and transfer the amplified signal to the transmitter, when the level of the extracted interference signal is compared with a predetermined threshold value and the level of the interference signal is thus smaller than the threshold value.

In some exemplary embodiments, the terminal further includes an interference removing unit to remove an interference signal included in the received wireless signal, wherein the repeating controller transfers the wireless signal in which the interference signal is removed by the interference removing unit to the signal processor when the level of the interference signal is smaller than the threshold value.

According to another exemplary aspect, there is provided a method of repeating in an MBS communication network constructed of at least one BS, the method of repeating through a terminal that is provided with contents in the MBS communication network including: receiving a wireless signal for the contents from a BS constituting the MBS communication network; processing contents included in the received wireless signal and providing a user with the contents; extracting a level of an interference signal from the wireless signal, when the contents to be processed provide the user with an MBS service; and repeating the received wireless signal to another adjacent terminal in the MBS communication network, when the level of the extracted interference signal is compared with a predetermined threshold value and the level of the interference signal is thus smaller than the threshold value.

According to the present invention, it is possible to remove a shadow area in an MBS area where a mobile broadcasting service is provided and a reception signal quality for terminals in a boundary area between MBS areas is improved, thereby providing high quality contents.

Further, according to the present invention, an idle resource of a terminal can be utilized by adopting repeating in an MBS transmission mode only using a terminal.

Further, according to the present invention, it is possible to create a novel business model that utilizes a repeating terminal, without affecting a Unicast transmission mode.

Other objects, features and advantages will be apparent from the following description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain aspects of the invention.

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

The present invention suggests a method to extend a service area and improve a transmission quality by operating a terminal that receives an MBS service in a mobile IPTV service network in a repeating mode. Generally, a radio signal repeating apparatus includes an analog repeater that amplifies a received RF signal as it is and transmits it, and a relay station that converts a received RF signal into a baseband signal, and processes and transmits it.

In the relay station, two methods are used, including a method where a received RF signal is channel decoded, re-encoded, modulated, and retransmitted, and a method where the received RF signal is demodulated, modulated and transmitted.

In the method where the channel decoding procedure is performed, 1 frame should be delayed due to the channel decoding and encoding procedures and contents directly received from the BS and contents received through the terminal repeater are different from each other so that it is not possible to synchronize broadcasting contents, and thus not proper for a repeating method of a broadcasting network.

On the other hand, in the method where the received RF signal is demodulated, modulated and transmitted, a frame delay does not occur, and thus it is applicable to a broadcasting network. In the case of an analog repeater, it is possible to immediately amplify and retransmit the received signal when applying an interference removing algorithm.

Accordingly, the present invention relates to a performance improvement of an MBS network when an analog repeating function is applied to a terminal and a method of demodulating, modulating and retransmitting the received RF signal (referred to as a demodulation repeating transmission method, hereinafter) is applied to the terminal.

Figure 1:
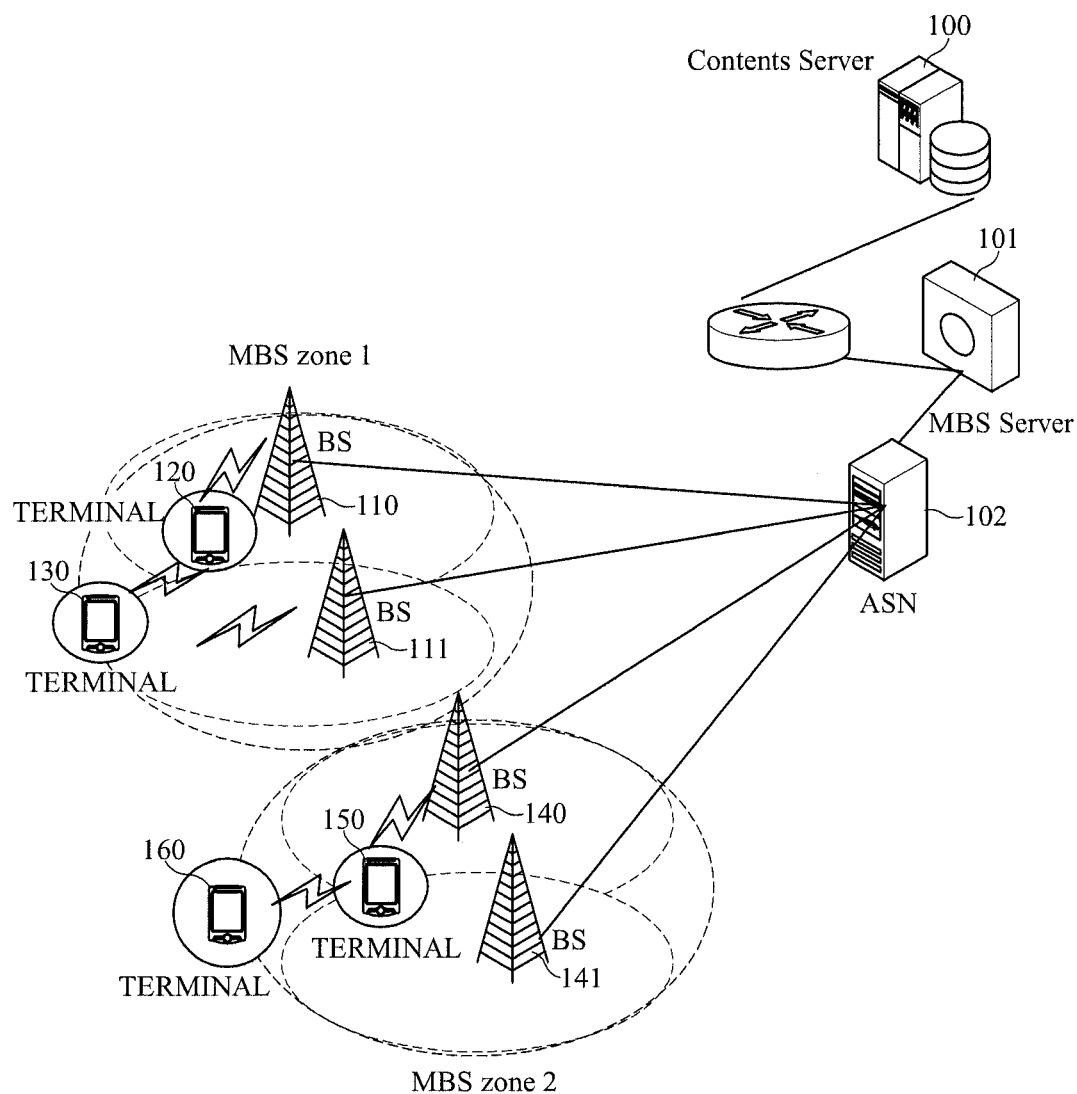
FIG. 1 is a conceptual diagram illustrating a mobile broadcasting network that performs repeating through a terminal according to a preferred embodiment of the present invention.

FIG. 1 is a conceptual diagram illustrating a mobile broadcasting network that performs repeating through a terminal according to a preferred embodiment of the present invention. Referring to FIG. 1, a mobile broadcasting network of the present invention includes a contents server 100, an MBS server 101, an ASN gateway 102, base stations (BSs) 110, 111, 140 and 141, and terminals 120, 130, 150 and 160.

The mobile broadcasting network integrates a plurality of BSs, 110 and 111 to construct an MBS area and minimize interference, so that it provides high quality contents.

As such, there are a plurality of broadcasting networks (MBS areas) consisting of a plurality of BSs 110 and 111, which constitute mobile broadcasting service areas. Contents transmitted from the contents service 100 are transferred to the MBS area by way of the MBS server 101 and the ASN gateway 102.

Here, the MBS server 101 assigns/controls RF resources of each of the MBS zones (MBS zone 1, MBS zone 2). That is, the BSs 110 and 111 belonging to the MBS zone 1 assign the same RF resource at the same time when the BSs transmit the contents to the terminals so that they are operated not to interfere the terminals.

However, the MBS zone 1 and MBS zone 2 transmit contents different from each other and thus an interference phenomenon may occur. Additionally, the RF signal transmitted from the BSs 110 and 111 decreases in reverse proportion to a distance from a BS so that the BS communicates with the terminal located in an edge of a cell in a low modulation scheme.

Further, a shadow area occurs in the BS due to a shadowing phenomenon caused by buildings in each BS and a fading phenomenon caused by a mobile terminal or a moving object, thereby deteriorating a quality of a broadcasting communication service.

In order to improve this, when the terminal 120 is in an MBS transmission mode, it receives the RF signal from the BS 110 and performs its own processing and consumption, and at the same time retransmits the received RF signal to a nearby terminal.

That is, the terminals 120 and 150 amplify and repeat (broadcast) the RF signal received by itself to a nearby BS, and the terminals 130 and 160 that receive the repeated RF signal can receive a high quality RF signal, and recover and use a high quality of contents.

Figure 2:
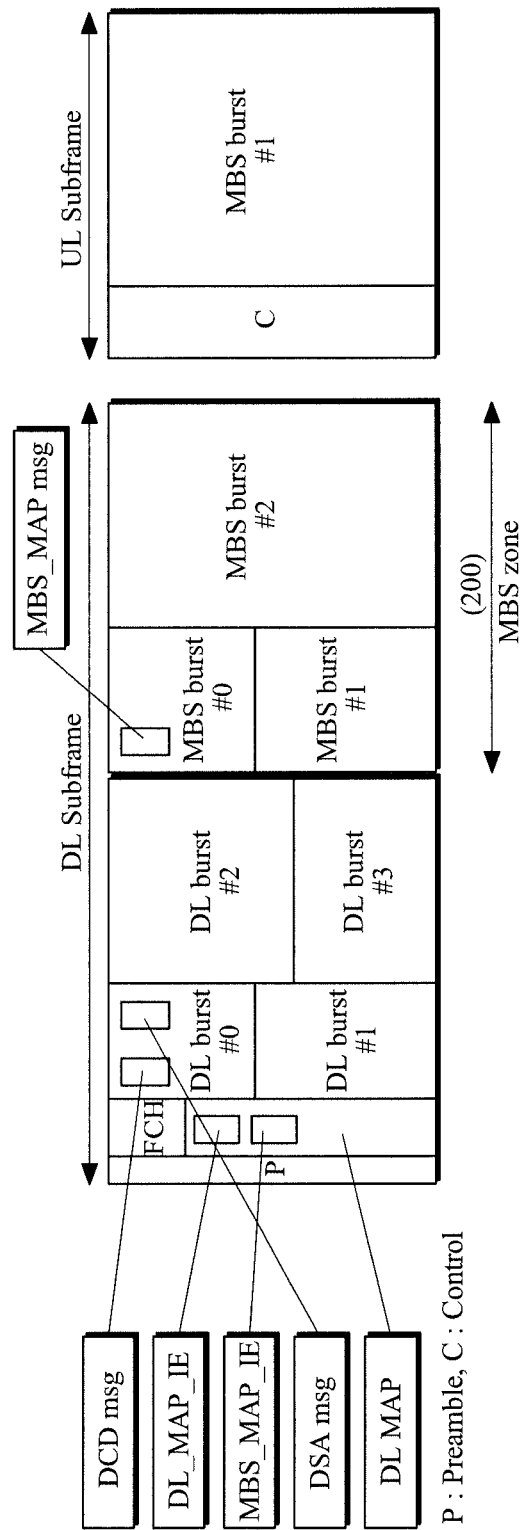
FIG. 2 is a constructional diagram illustrating a broadcasting frame used in a mobile broadcasting network according to a preferred embodiment of the present invention.

FIG. 2 is a constructional diagram illustrating a broadcasting frame used in a mobile broadcasting network according to a preferred embodiment of the present invention. FIG. 2 illustrates a frame structure of a mobile communication system that uses an orthogonal frequency division multiple access (OFDMA)/time division duplexing (TDD) scheme.

While it is possible to repeat a signal in a Unicast zone too, this case is not reasonable because a size of the retransmission power of the normal terminal is small and the retransmission is made for a specified terminal only, and thus it is preferable for the terminal to be repeated with respect to the MBS only.

Figure 3:
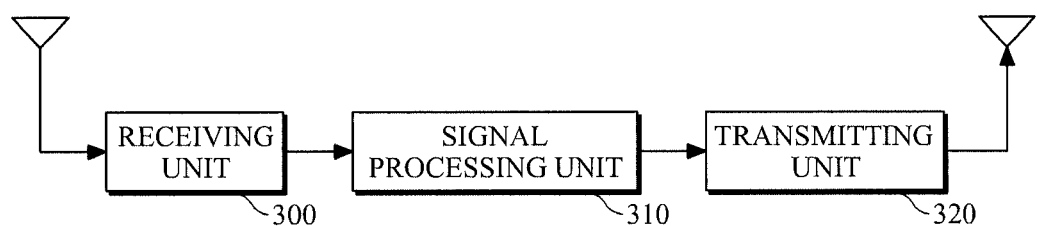
FIG. 3 is a block diagram illustrating a construction of a terminal that performs repeating in a mobile broadcasting network according to a preferred embodiment of the present invention.

FIG. 3 is a block diagram illustrating a construction of a terminal that performs repeating in a mobile broadcasting network according to a preferred embodiment of the present invention. Referring to FIG. 3, the terminal may include a receiving unit 300, a signal processing unit 310, and a transmitting unit 320.

The receiving unit 300 receives an RF signal for contents from a BS constituting an MBS communication network.

The signal processing unit 310 amplifies or converts the RF signal received from the receiving unit 300 so as to process it. The signal processing unit 310 can amplify the signal for the MBS zone among frames included in the RF signal.

The transmitting unit 320 repeats the RF signal processed in the signal processing unit 310.

Figure 4:
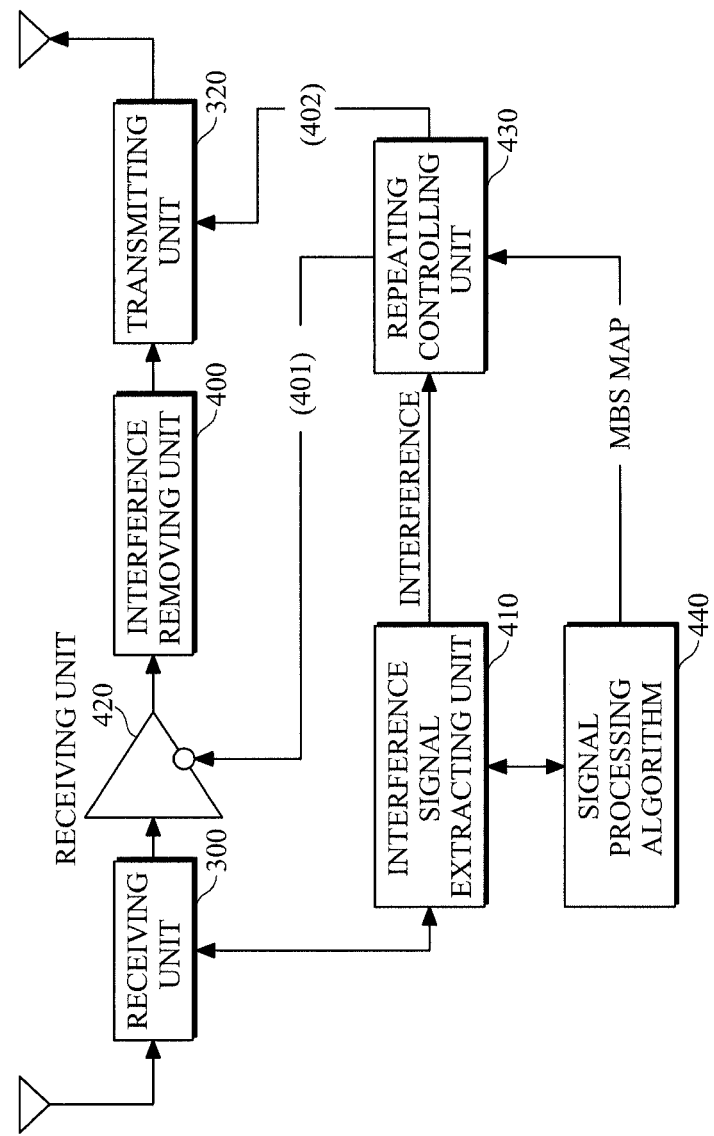
FIG. 4 is a schematic block diagram illustrating a construction of a terminal that has an interference removing function for repeating in a mobile broadcasting network according to a preferred embodiment of the present invention.

FIG. 4 is a schematic block diagram illustrating a construction of a terminal that has an interference removing function for repeating in a mobile broadcasting network according to a preferred embodiment of the present invention. Referring to FIG. 4, the terminal can include a receiving unit 300, an interference removing unit 400, an interference signal extracting unit 410, a signal amplifying unit 420, a repeating controlling unit 430, a signal processing algorithm 440, and a transmitter 320.

The terminal receives the RF signal from an antenna and then processes contents of a Unicast scheme by way of a receiving unit 300 and a signal processing algorithm 440.

The extracted interference signal is transferred to the repeating controlling unit 430, and the repeating controlling unit 430 determines whether the received RF signal is to be retransmitted using a level of the transferred interference signal.

When the repeating controlling unit 430 determines to make a retransmission, signals are sent to the signal amplifying unit 420 and transmitting unit 320 (401, 4012) to perform a retransmission procedure.

When receiving a retransmission command from the repeating controlling unit 430, the signal amplifying unit 420 amplifies the RF signal and the interference removing unit 400 removes the interference signal included in the RF signal that is fed back in the repeating procedure.

The RF signal passed through and processed in the signal amplifying unit 420 and interference removing unit 400 is retransmitted to another terminal or BS from the transmitting unit 320 according to a repeating delivery gain transferred to the transmitting unit 320 from the repeating controlling unit 430.

Figure 5:
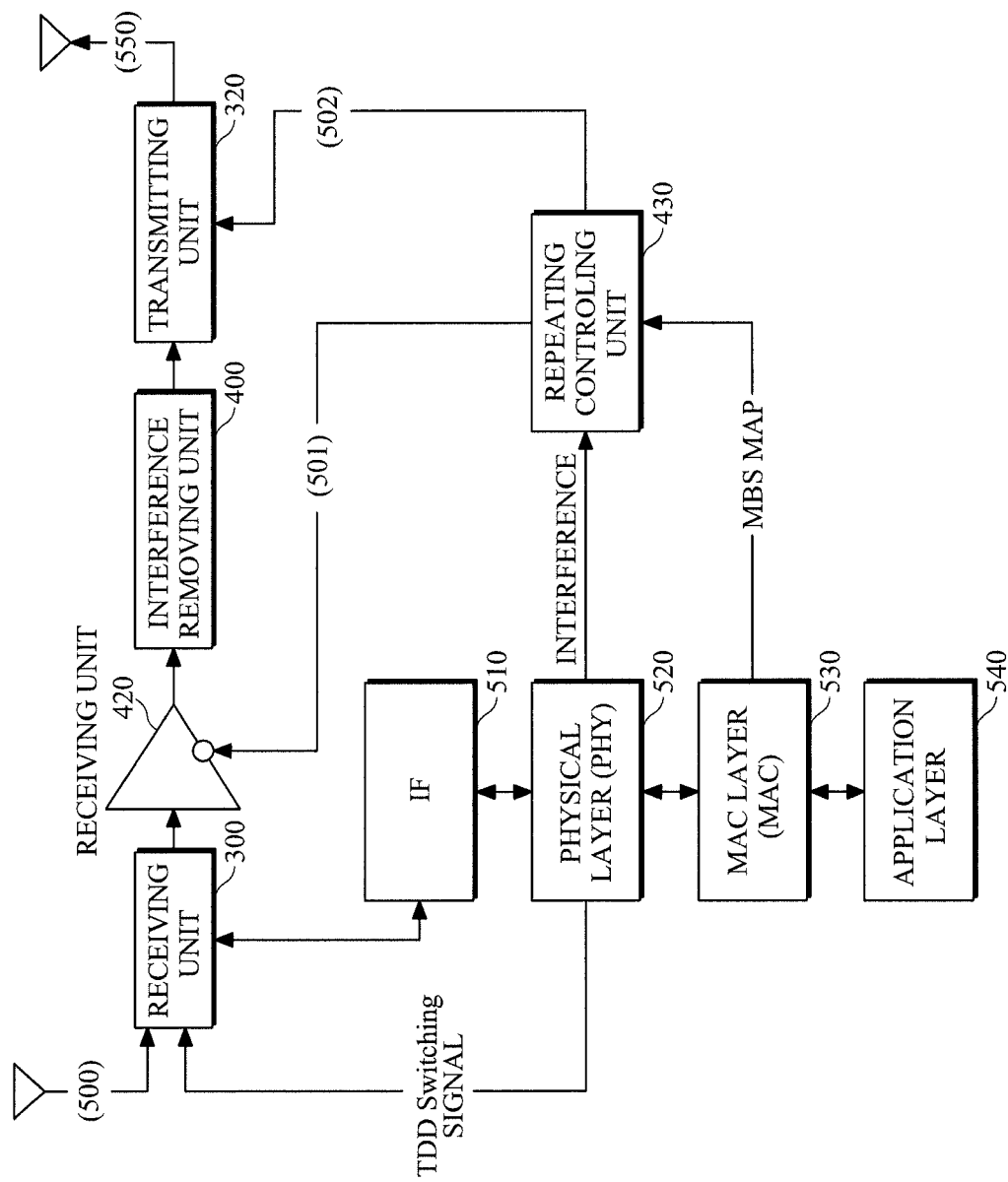
FIG. 5 is a detailed block diagram illustrating a construction of a terminal that has an interference removing function for repeating in a mobile broadcasting network according to a preferred embodiment of the present invention.

FIG. 5 is a detailed block diagram illustrating a construction of a terminal that has an interference removing function for repeating in a mobile broadcasting network according to a preferred embodiment of the present invention.

In a basic signal processing procedure of FIG. 5, the interference signal is removed and the removed signal is transmitted to another terminal or BS, as in FIG. 4, but a signal processing algorithm in FIG. 4 is embodied in harmony with a real construction of a terminal and illustrated in detail.

The terminal receives an RF signal from an antenna 500 and then normally processes contents of a Unicast scheme through a receiving unit 300, an IF device 510, a physical layer 520, a MAC layer 530, and an application layer 540. When the terminal enters an MBS transmission mode by information (MBS MAP decoding) from the MAC layer 530, the repeating controlling unit 430 transmits (501, 502) an ON signal and repeating delivery gain value to the interference removing unit 400 and transmitter 320 at an MBS service time only, thereby controlling a retransmission power.

In this case, the repeating controlling unit 430 receives an interference signal from the physical layer 520 and performs a repeating retransmission only when a level of the interference signal is smaller than a threshold value, and then operates not to interfere with an adjacent MBS zone.

Here, the threshold value Th is a numerical value used to determine whether a level of the interference signal is a level at which an interference does not occur from a signal transferred from a BS in an adjacent MBS zone other than the BS in an MBS zone to transfer an RF signal to the relevant terminal, and it can be variously selected according to a property of the mobile broadcasting network to be used.

Figure 6:
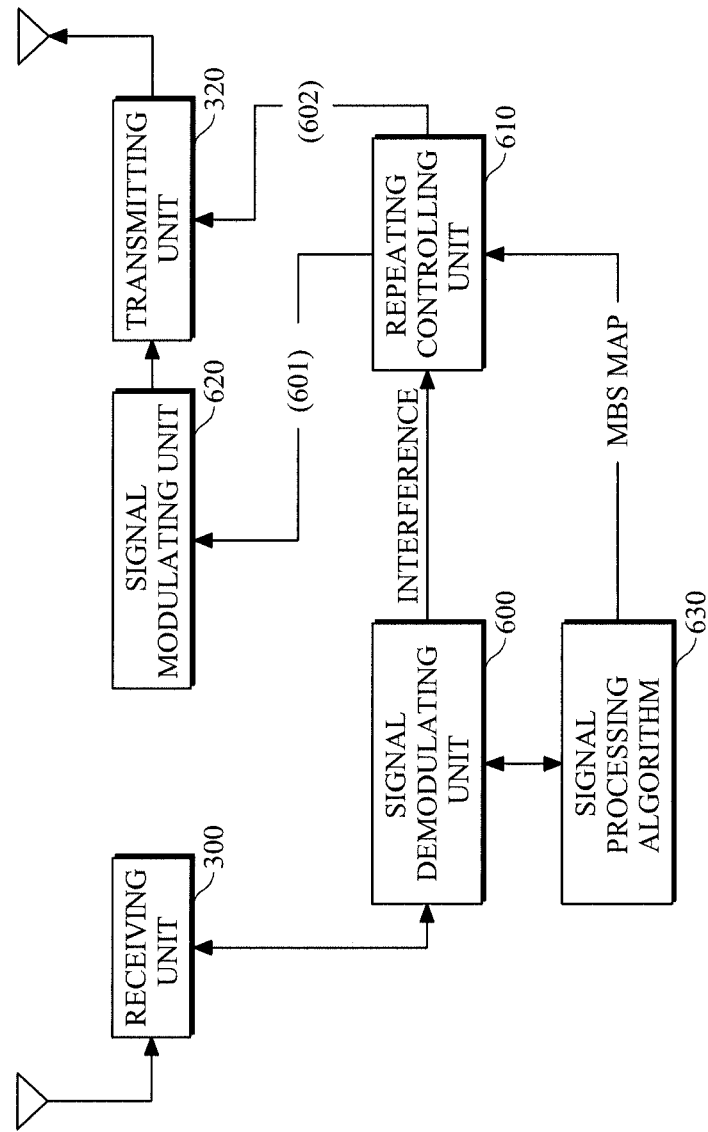
FIG. 6 is a schematic block diagram illustrating a construction of a terminal that has a demodulation repeating function for repeating in a mobile broadcasting network according to a preferred embodiment of the present invention.

FIG. 6 is a schematic block diagram illustrating a construction of a terminal that has a demodulation repeating function for repeating in a mobile broadcasting network according to a preferred embodiment of the present invention.

Referring to FIG. 6, the terminal can include a receiving unit 300, a transmitting unit 320, a signal demodulating unit 600, a repeating controlling unit 610, a signal demodulating unit 620, and a signal processing algorithm 630. The terminal receives an RF signal from an antenna and then processes contents of a Unicast scheme through a receiving unit 300 and signal processing algorithms.

The signal demodulating unit 600 demodulates the RF signal transferred to the receiving unit 300 and recovers an original signal. Further, an interference signal is extracted from the received RF signal and transferred to the repeating controlling unit 610.

The repeating controlling unit 610 determines whether the received RF signal is retransmitted or not using a level of the transferred interference signal.

When the repeating controlling unit 610 determines to make a retransmission, a signal is transferred to the signal demodulating unit 620 and transmitting unit 320 to perform the retransmission procedure (601, 602).

When a retransmission command is received from the repeating controlling unit 610, the signal modeling unit 620 modulates the RF signal to a signal through which an original signal can be effectively transmitted, and the RF signal processed as described above is retransmitted to another terminal or BS according to a repeating delivery gain 602 transferred to the transmitting unit 320 from the repeating controlling unit 610.

Figure 7:
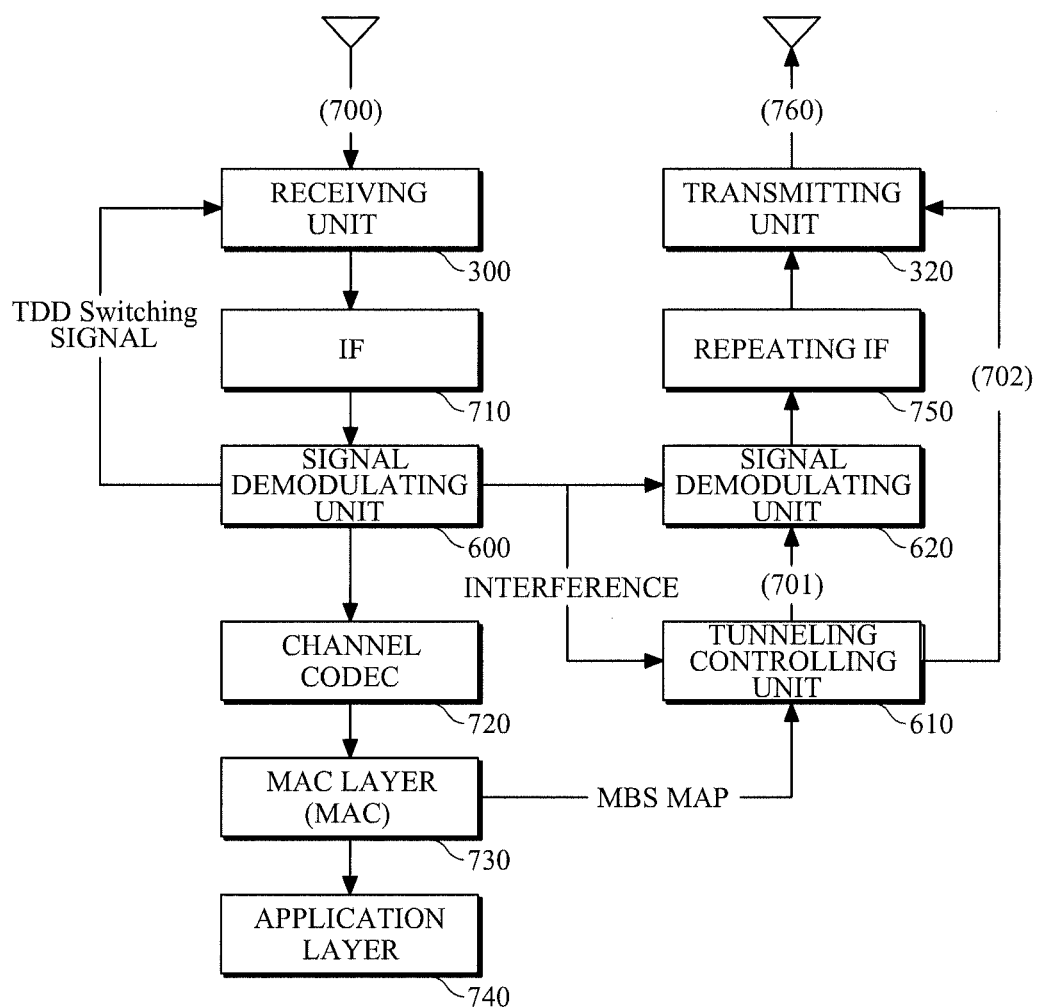
FIG. 7 is a detailed block diagram illustrating a construction of a terminal that has a demodulation repeating function for repeating in a mobile broadcasting network according to a preferred embodiment of the present invention.

FIG. 7 is a detailed block diagram illustrating a construction of a terminal that has a demodulation repeating function for repeating in a mobile broadcasting network according to a preferred embodiment of the present invention.

In a basic signal processing procedure of FIG. 7, the interference signal is removed and the removed signal is transmitted to another terminal or BS, as in FIG. 6, but a signal processing algorithm in FIG. 6 is embodied in harmony with a real construction of a terminal and illustrated in detail.

The terminal receives an RF signal from an antenna 700 and then normally performs communication in a Unicast scheme through a receiving unit 300, an IF device 710, a signal demodulating unit 600, a channel codec 720, a MAC layer 730, and an application layer 740.

When the terminal enters an MBS transmission mode by information (MBS MAP decoding) from the MAC layer 730, the repeating controlling unit 610 demodulates the RF signal received from the signal modulating unit 620, the repeating IF 750, the transmitting unit 3320, and the service antenna 760 at the MBS service time only, and modulates and broadcasts to other terminals.

In such a case, it is possible to perform error resilient repeating by forming an RF signal through a demodulation and re-modulation for the received signal. For this, the repeating controlling unit 610 transmits an ON/OFF signal 701 for the signal modulating unit 620, and transmits an ON/OFF and a repeating delivery gain value 702 to the transmitter 320, thereby controlling the retransmission power.

Further, in this case, the repeating controlling unit 610 receives an interference signal from the signal demodulating unit 600, and repeats it when a level of the interference signal is smaller than the threshold value only, thereby operating not to interfere with a nearby MBS zone.

Figure 8:
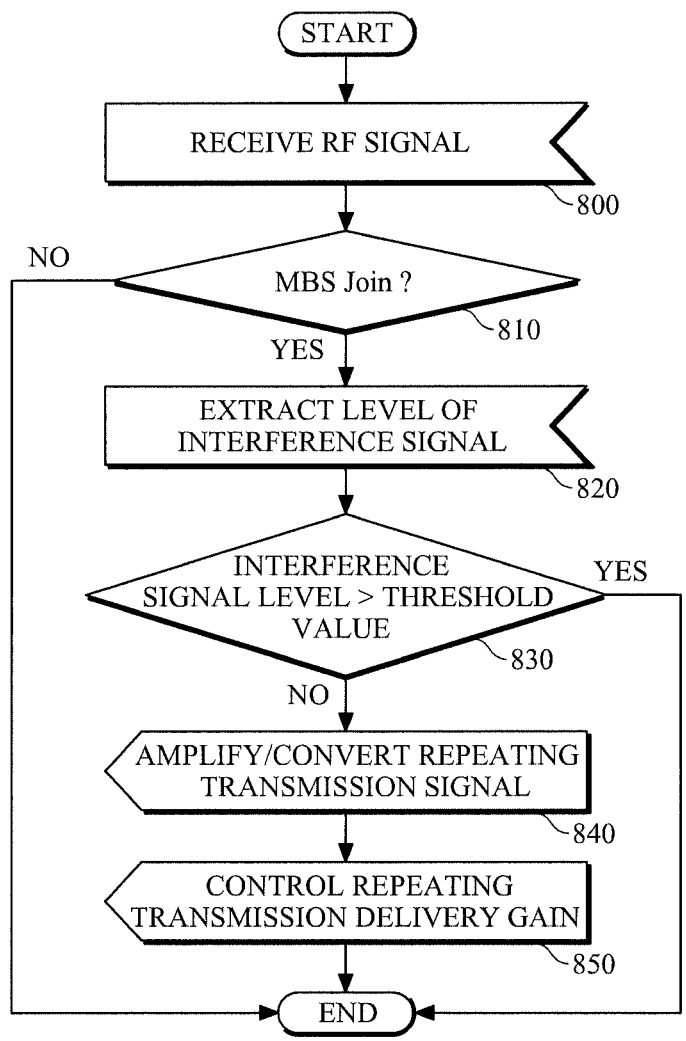
FIG. 8 is a flow chart illustrating a procedure to perform repeating in a mobile broadcasting network according to a preferred embodiment of the present invention.

FIG. 8 is a flow chart illustrating a procedure of performing repeating in a mobile broadcasting network according to a preferred embodiment of the present invention.

The terminal receives a signal through a provisioning procedure with a BS, and receives an MBS MAP from a MAC layer of the terminal when entering the MBS mode, thereby performing an analysis (800).

When the terminal enters the MBS mode (810), the modulator extracts a level of the interference signal from the received signal and the terminal receives a level of the extracted interference signal (820).

A level of the interference signal is compared with a threshold value Th (830), and the terminal enters a terminal repeating mode only when the level of the interference signal is smaller than the threshold value Th. This is a case where the terminal is positioned near another MBS zone when the level of the interference signal is greater than the threshold value. This serves to prevent it from affecting the other MBS zone when the terminal operates in the terminal repeating mode.

Subsequently, the terminal operates in the repeating mode, converts the RF signal repeated using a gain value that is in reverse proportion to the level of the interference signal (840), and controls an output of the RF signal (850).

An aspect of the present invention can be embodied with code readable by a computer on a record medium readable by a computer. The codes and code segments embodying the program can be conceived by a computer programmer in the relevant field. The record medium readable by the computer includes every kind of record device in which data readable by the computer system is stored. The record medium readable by the computer includes ROM, RAM, CD-ROM, magnetic tape, floppy disk, and optical disc, for example. Further, the record medium readable by the computer is distributed in the computer system connected in a network, stored and executed by codes readable by the computer in a distribution scheme.

It will be apparent to those of ordinary skill in the art that various modifications can be made to the exemplary embodiments of the invention described above. However, as long as modifications fall within the scope of the appended claims and their equivalents, they should not be misconstrued as a departure from the scope of the invention itself.

What is claimed is:

1. A terminal for receiving contents through a multicast and broadcasting service (MBS) communication network consisting of at least one base station (BS), the terminal for repeating through the MBS communication network comprising:
    a receiver to receive a wireless signal for the contents from a BS constituting the MBS communication network;
    a signal processor to amplify or convert the received wireless signal; and
    a transmitter to repeat the processed wireless signal and to transmit the processed wireless signal to an adjacent BS or terminal in the MBS communication network,
    wherein
    the signal processor includes:
        an interference signal extractor to extract a level of an interference signal other than the signal for the contents to be provided among the received wireless signal;
        a signal amplifying unit to amplify the received wireless signal; and
        a repeating controller to determine whether the received wireless signal is to be retransmitted based on the level of the interference signal, enable the amplifying unit to amplify the signal for the MBS zone among frames included in the received wireless signal and transfer the amplified signal to the transmitter, when the level of the extracted interference signal is found to be smaller than a predetermined threshold value, and
    the repeating controller controls a transmission gain of the signal transmitted from the transmitter in consideration of the level of the interference signal so that interference does not occur in another adjacent MBS communication network that generates the interference signal, wherein the terminal consumes the received wireless signal and at the same time retransmits the received wireless signal, when the terminal is in an MBS transmission mode.

2. The terminal of claim 1, further comprising an interference removing unit to remove an interference signal included in the received wireless signal,
    wherein the repeating controller transfers the wireless signal in which the interference signal is removed by the interference removing unit to the signal processor when the level of the interference signal is smaller than the threshold value.

3. The terminal of claim 1, wherein the signal processor includes:
    a signal demodulator to extract a level of an interference signal other than the signal
    for the contents to be provided among the received wireless signal and demodulate the received wireless signal;
    a signal modulator to restructure and modulate the demodulated wireless signal; and
    a repeating controller to enable the signal modulator to modulate the demodulated wireless signal and transfer the modulated wireless signal to the transmitter, when the level of the extracted interference signal is found to be smaller than a predetermined threshold value.

4. The terminal of claim 3, wherein the repeating controller controls a transmission gain of the signal transmitted from the transmitter in consideration of the level of the interference signal so that interference does not occur in another adjacent MBS communication network that generates the interference signal.

5. The terminal of claim 1, wherein the repeating controller sets a transmission gain that is in reverse proportion to the level of the interference signal, and enables the transmitter to transmit the set transmission gain.

6. A method of repeating in a multicast and broadcasting service (MBS) communication network consisting of at least one base station (BS), the method of repeating through a terminal that is provided with contents in the MBS communication network comprising:

receiving a wireless signal for the contents from a BS constituting the MBS communication network;

processing contents included in the received wireless signal and providing a user with the contents;

extracting a level of an interference signal from the wireless signal, when the contents to be processed provide the user with an MBS service;

determining whether the received wireless signal is to be retransmitted based on the level of the interference signal;

repeating the received wireless signal to another adjacent terminal in the MBS communication network, when the level of the extracted interference signal is found to be smaller than a predetermined threshold value; and controlling a transmission gain of the repeated signal in consideration of the level of the interference signal so that interference does not occur in another adjacent MBS communication network that generates the interference signal, wherein the terminal consumes the received wireless signal and at the same time retransmits the received wireless signal, when the terminal is in an MBS transmission mode.

* * * * *